United States Patent
Gorday et al.

(10) Patent No.: US 7,593,718 B2
(45) Date of Patent: Sep. 22, 2009

(54) WLAN COMMUNICATION SYSTEM AND METHOD WITH MOBILE BASE STATION

(75) Inventors: Paul E. Gorday, West Palm Beach, FL (US); Robert M. Gorday, Wellington, FL (US); Salvador Sibecas, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 1159 days.

(21) Appl. No.: 10/334,383

(22) Filed: Dec. 31, 2002

(65) Prior Publication Data

US 2004/0203836 A1   Oct. 14, 2004

(51) Int. Cl.
    H04L 12/58       (2006.01)
(52) U.S. Cl. .............. 455/412.1; 455/11.1; 455/412.2; 455/413; 455/421; 455/456.1; 455/456.2; 455/41.2; 455/41.3; 455/553.1; 370/338; 370/349; 370/401; 379/67.1; 379/68; 379/88.25; 709/202; 709/203; 709/238
(58) Field of Classification Search ............... 455/11.1, 455/456.1, 456.2, 421, 414.1, 414.2, 41.2, 455/553.1, 554.2, 41.3, 412.1, 413, 456; 370/349, 401, 338; 709/202, 203, 238; 379/67.1, 379/68, 88.25
See application file for complete search history.

(56) References Cited

U.S. PATENT DOCUMENTS

| | | | |
|---|---|---|---|
| 4,539,706 A * | 9/1985 | Mears et al. | 455/11.1 |
| 4,630,196 A * | 12/1986 | Bednar et al. | 709/202 |
| 5,384,824 A * | 1/1995 | Alvesalo | 455/456.2 |
| 5,850,605 A * | 12/1998 | Souissi et al. | 455/437 |
| 5,991,287 A * | 11/1999 | Diepstraten et al. | 370/338 |
| 6,026,277 A * | 2/2000 | Gavrilovich | 455/11.1 |
| 6,047,051 A * | 4/2000 | Ginzboorg et al. | 379/130 |
| 6,216,001 B1 * | 4/2001 | Ghirnikar et al. | 455/435.1 |
| 6,377,795 B1 | 4/2002 | Bach et al. | |
| 6,556,666 B1 * | 4/2003 | Beyda et al. | 379/88.12 |
| 6,721,305 B1 * | 4/2004 | Chan et al. | 370/349 |
| 6,813,501 B2 * | 11/2004 | Kinnunen et al. | 455/456.2 |
| 7,149,501 B2 * | 12/2006 | Haumont et al. | 455/413 |
| 2002/0055972 A1 * | 5/2002 | Weinman, Jr. | 709/203 |
| 2002/0087704 A1 * | 7/2002 | Chesnais et al. | 709/228 |
| 2002/0101857 A1 | 8/2002 | Heller | |
| 2002/0136226 A1 * | 9/2002 | Christoffel et al. | 370/401 |
| 2002/0147837 A1 * | 10/2002 | Heller | 709/238 |

FOREIGN PATENT DOCUMENTS

| | | |
|---|---|---|
| GB | 2309138 A | 7/1997 |
| WO | WO 96/27993 | 9/1996 |
| WO | WO-9627993 | * 9/1996 |

* cited by examiner

*Primary Examiner*—Stephen M D'Agosta
(74) *Attorney, Agent, or Firm*—Vedder Price P.C.

(57) ABSTRACT

A WLAN communication system (10) and method employs mobile WLAN base stations (16) that include WLAN transceivers (26) and memory (30) for storing received messages from one or more mobile WLAN devices (12a-12n). The mobile WLAN base stations (16) serve as moving message carriers or message repeaters of messages for the mobile WLAN devices. In one embodiment, a mobile WLAN base station (16) receives messages transmitted by several mobile WLAN devices (12a-12n), temporarily stores the received messages, and delivers the stored messages to a fixed WLAN base station or another mobile WLAN base station when the mobile WLAN base station (16) moves to within communication range of the applicable fixed or other mobile WLAN base station.

23 Claims, 5 Drawing Sheets

WLAN COMMUNICATION SYSTEM AND METHOD WITH MOBILE BASE STATION

FIELD OF THE INVENTION

The invention relates generally to wireless communication systems and, more particularly, to wireless local area networks, devices and systems.

BACKGROUND OF THE INVENTION

Wireless local area networks (WLANs) are known and typically utilize short-range transmission protocols, such as Bluetooth and/or IEEE 802.11, to communicate information among WLAN devices. WLANs are being employed for simple wireless connections of peripheral devices and are being used in self-organizing piconets in which mobile WLAN devices connect to fixed base stations or other mobile devices.

In addition, wireless mobile devices are being made with integrated WLAN transceivers and wireless wide area network (WWAN) transceivers, such as cellular and/or paging transceivers. However, such devices typically use the differing transceivers in conventional manners to communicate over their respective networks.

Some wireless mobile devices, such as personal digital assistants (PDAs) and cellular phones, now employ a small, low cost WLAN transceiver allowing access to the Internet or other wide area network through a personal computer or other suitable Bluetooth port. For such devices, wide area coverage (or at least wide area data coverage is sacrificed for lower power consumption, size, and cost, and little or no access fees. Due to the small coverage areas of WLANs, it is very difficult for WLAN base sites to cover geographic areas as large as a city or even a significant part of a large city.

Thus, it would be desirable to improve the coverage areas of conventional WLAN communication systems in a cost effective manner.

BRIEF DESCRIPTION OF THE DRAWINGS

The present invention is illustrated by way of example and not limitation in the accompanying figures, in which like references numerals indicate similar elements, and in which.

DETAILED DESCRIPTION OF THE PREFERRED EMBODIMENT

Figure 1:
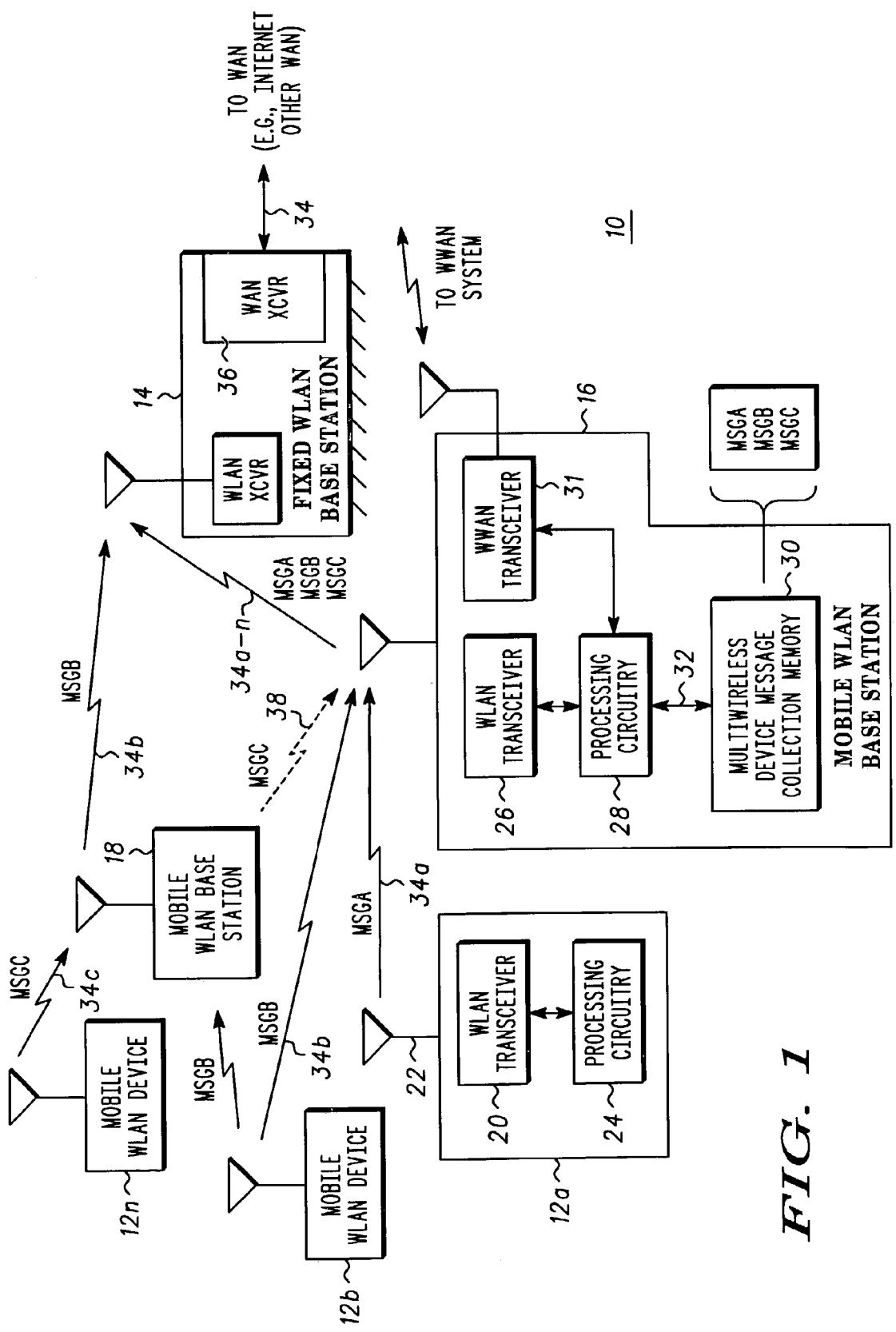
FIG. 1 is a block diagram illustrating a WLAN communication system in accordance with a preferred embodiment of the present invention.

A WLAN communication system employs mobile WLAN base stations that include WLAN transceivers and multi-wireless device message collection memory that stores received messages from one or more fixed WLAN devices or mobile WLAN devices. The mobile WLAN base stations essentially serve as moving message carriers or message repeaters of messages for the sending mobile WLAN devices. Messages include any information such as, but not limited to, video, audio, or any other suitable information sent by a mobile WLAN device. In one embodiment, a mobile WLAN base station receives messages transmitted by several mobile WLAN devices, temporarily stores the received messages, and delivers the stored messages to a fixed WLAN base station or another mobile WLAN base station when the mobile WLAN base station moves to within communication range of the applicable fixed or other mobile WLAN base station. Accordingly, if a vehicle, such as a bus or train, is outfitted with a mobile WLAN base station, the vehicle becomes a potential message carrier for mobile WLAN devices. Such use of a mobile WLAN base station provides an increase in system coverage area over conventional WLAN systems.

In an alternative embodiment, the mobile WLAN base station serves as a message repeater and does not queue messages, but instead temporarily stores them and forwards them as soon as it can communicate with a wireless wide area network (WWAN). As such, the mobile WLAN base stations may also include WWAN transceivers, such as cellular or paging transceivers, so that the mobile WLAN base stations may immediately communicate received messages to a wide area network without first interfacing with fixed WLAN base stations, thereby enabling the messages to be more expediently relayed to the network or service provider of the wide area network.

In another and preferred embodiment, fixed WLAN collector base stations are also used. Such collector base stations receive and store messages from mobile WLAN devices and then automatically download the stored messages to a mobile WLAN base station when the mobile WLAN base station comes within communication range of the fixed collector base station. The fixed WLAN collector base stations are preferably located at natural stopping points of mobile WLAN devices, such as bus stops, traffic lights, train stations, shopping malls, or other suitable stopping points. Fixed collector base stations may also be distributed along transportation routes of mobile WLAN base stations to ensure that messages collected by the mobile WLAN base stations can eventually be uploaded to or downloaded by the mobile WLAN base stations and delivered to a network or service provider. Where a mobile WLAN base station is affixed to a vehicle, for example, the mobile WLAN base station may periodically pass by one or more fixed WLAN collector base stations to collect messages stored by the fixed WLAN collector base station(s) and deliver the stored messages to the network or service provider.

The fixed WLAN base stations may also employ wireless wide area network (WWAN) transceivers to facilitate use of a wide area network communication system for purposes of communicating messages to a land line phone system, the Internet, or some other suitable wide area network. Fixed WLAN base stations may further be coupled to a network, such as the Internet or another wide area network, so that messages received by the fixed WLAN base stations may be suitably delivered from the WLAN system to another system and, subsequently, to its final destination.

FIG. 1 is a block diagram illustrating one example of a wireless communication system 10 which in this example, is a wireless local area network (WLAN) communication system. As used herein, WLAN includes any suitable short range wireless local area network including but not limited to wireless personal area networks. The wireless communication system 10 employs a plurality of mobile WLAN devices, at least one fixed WLAN device 14, such as a fixed WLAN base station, and at least one mobile WLAN base station 16. For purposes of illustration, another mobile WLAN base station 18 is also shown. The mobile WLAN devices 12a-12n may be any suitable mobile WLAN devices, including, but not limited to, PDAs, cell phones, lap top computers, or any other suitable devices that employ a WLAN transceiver to facilitate WLAN communication. The mobile WLAN devices 12a-12n may also include WWAN transceivers to communicate via a wireless wide area network such as a cellular network or other suitable network, as known in the art. As used herein "message" includes any information whether streaming information, packet information or any other information.

The mobile WLAN device 12a includes a WLAN transceiver 20 operatively coupled to antenna 22 and processing circuitry 24 operatively coupled to the WLAN transceiver to send and receive suitable information via a WLAN protocol. The processing circuitry 24 may be, for example, one or more suitably programmed microprocessors, microcontrollers, DSPs or other device and therefore includes associated memory that contains executable instructions that when executed causes the processing circuitry to carry out the operations described herein. In addition, processing circuitry as used herein, includes discrete logic, state machines or any other suitable combination of hardware, software and firmware.

The mobile WLAN base station 16 also includes a WLAN transceiver 26, processing circuitry 28 and multi-wireless device message collection memory 30 operatively coupled to the processing circuit 28 to a suitable bus 32. Multi-wireless device message collection memory 30 may be any suitable memory element that stores digital data. This includes but is not limited to ROM, RAM distributed memory and any other suitable memory.

The mobile WLAN devices 12a-12n send messages 34a-34n wirelessly using their respective WLAN transceivers, as known in the art. The mobile WLAN base station 16 in this example receives messages 34a and 34b from mobile WLAN devices 12a and 12b respectively, and also receives repeated message 38 from another mobile WLAN base station 28. The message 38 was originated by mobile WLAN device 12n. Accordingly, the mobile WLAN base station 16 stores the received messages in messages 34a, 34b and 38 in the multi-wireless device message collection memory 30.

The fixed WLAN device 14 also includes a suitable transceiver and associated processing circuitry, and in addition, is shown to be coupled to a wide area network 34 through a suitable wide are network (WAN) transceiver 36, such as a modem or other suitable transceiver. The wide are network 34 may be the Internet or any other suitable wide area network. As such, the fixed WLAN device 14 will also be referred to as a fixed WLAN/WAN base station. The fixed WLAN/WAN base station receives the stored messages 34a-34n from the mobile WLAN base station if the messages are destined for the wide area network 36 to another network operatively coupled to the wide area network 34.

The mobile WLAN base station 16 includes suitable software modules executed by the processing circuitry to handle connections to other mobile WLAN devices as well as other mobile WLAN base stations and any other suitable communication devices as needed. In addition, the mobile WLAN base station also includes suitable encryption software to ensure privacy of the messages.

The mobile WLAN base station 16, in another embodiment, also includes a WWAN transceiver 31 operatively coupled to the multi-wireless device collection memory 30 so that the mobile WLAN base station 16 may communicate collected messages directly to a wide area network if desired, thereby bypassing, for example, the fixed WLAN device 14. As such, the mobile WLAN base station 16 need not store the received messages any longer than necessary to log onto a WWAN system, such as a cellular system, and transfer the information to the WLAN system. Hence, the processing circuitry 28 forwards the stored messages received from the mobile WLAN device to a WAN using the WWAN transceiver 31. The processing circuitry instructs the WWAN transceiver to transmit the stored message to the wide area network through another WWAN enabled device or base station.

Figure 2:
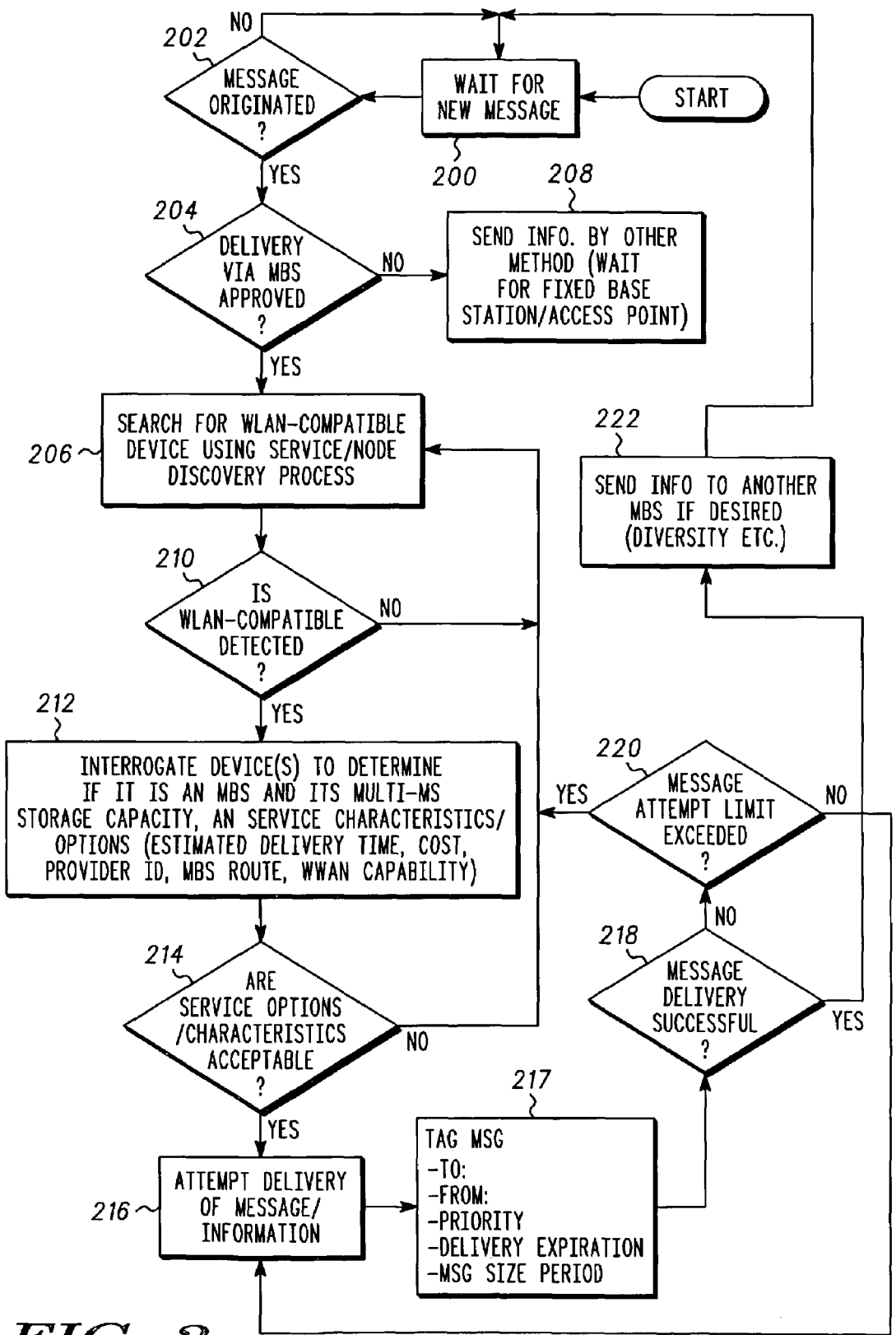
FIG. 2 is a flow chart illustrating a WLAN communication method taken from the perspective of a mobile WLAN device in accordance with a preferred embodiment of the present invention.

FIG. 2 illustrates one example of a WLAN communication method taken from the perspective of a mobile WLAN device 12a-12n. As shown in block 200, the method includes waiting for a user to enter or obtain a new message from a suitable source. As shown in block 202, the method includes determining if the message has been originated and hence, available for transmission. If the message is not complete, the method includes waiting for a message to be available for delivery. As shown in block 204, if the message is available for delivery, the method includes determining if the message can be sent using a mobile WLAN base station 16. For example, this may be done by a user entering, through a user interface, control data indicating that the user wishes to enter a mobile WLAN base station delivery mode to facilitate low cost communication of message. If this option has been selected or if the mobile WLAN device is in the mobile WLAN base station mode, the method proceeds to block 206. If the message has not been approved for delivery by the mobile WLAN base station, the method includes, as shown in block 208, sending the message by another technique, such as waiting for the mobile WLAN device to come within range of a fixed WLAN collector base station (as described further below) or a fixed WLAN device such as a WLAN/LAN base station.

As shown in block 206, the method includes performing an active or passive scan for WLAN compatible devices using a service or other discovery process as known in the art of the WLAN communication. As shown in block 210, the mobile WLAN device interrogates another mobile WLAN device to determine if the other mobile WLAN device is a mobile WLAN base station. As such, as shown in block 212, the method includes interrogating a WLAN compatible device to determine if the device is a mobile WLAN base station and to determine the capacity of the multi-wireless device message collection memory 30 to determine whether the message that needs to be sent can fit in the current mobile WLAN base station memory. As shown in block 214, the method also includes determining whether service options and characteristics are acceptable for the communication.

This may include receiving estimated delivery time of the message from the mobile WLAN base station, the estimated cost of the delivery based on, for example, the time of day or the size of the message, service provider identification data to determine whether the mobile WLAN device is authorized to use the service of the mobile WLAN base station, the route of the mobile WLAN base station, such as the street address in the case of the mobile WLAN base station being mounted to a vehicle, message priority information indicating a priority of a message or any other suitable service characteristics or service options as desired.

As shown in block 216, the method includes attempting delivery of the message information by transmitting the message via the WLAN transceiver 20 to the mobile WLAN base station 16. As shown in block 217 the method includes tagging the message to provide, for example, the message, size, delivery, expiration periods or any other suitable information. A user may enter user control data through a suitable user interface to indicate that the message should be sent to a plurality of different mobile WLAN base stations, to provide diversity reception by a receiving unit. As shown in block 222, the method includes the mobile WLAN base station determining if the message is authorized to be sent to another mobile WLAN base station. For example, the user, by selecting a menu through a user interface, may select that a message may be automatically communicated to a plurality of different mobile WLAN base stations to provide a diversity transmission of the message in an effort to allow a diversity receiver technique to be used by a subsequent receiving device (e.g., the mobile WLAN base station or other device).

As shown in block 218, the mobile WLAN base station determines if the message delivery was successful. If the delivery was not successful, the method includes determining whether the message attempt has been exceeded as shown in block 220. If the message attempt limit (such as a number of times an attempt would be made) has not been exceeded, another search will be made for a different WLAN compatible device as shown in block 206. However, if the message delivery is successful, the method includes waiting for a next message to be sent.

Figure 3:
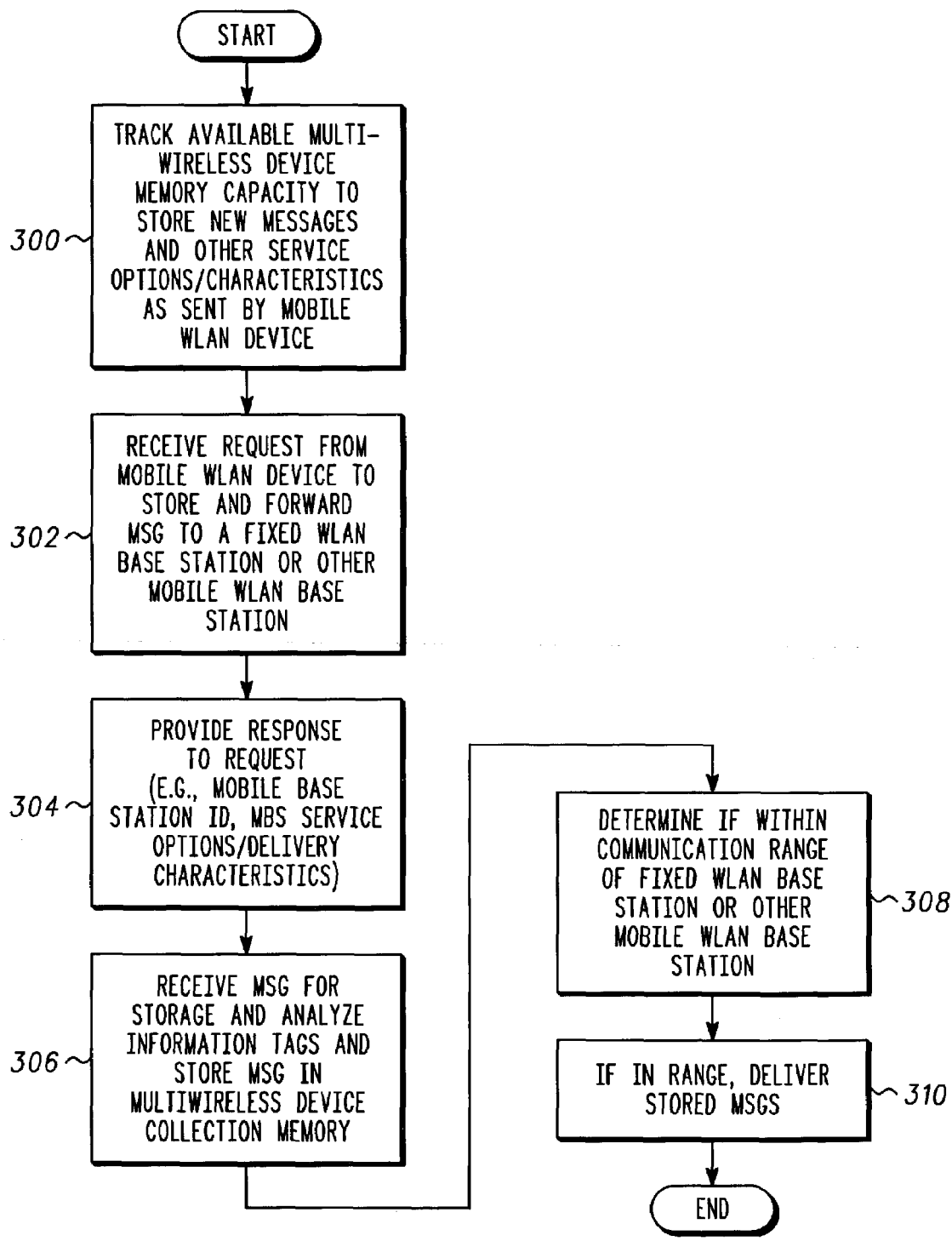
FIG. 3 illustrates a WLAN communication method taken from the perspective of a mobile WLAN base station in accordance with a preferred embodiment of the present invention.

FIG. 3 illustrates one example of a WLAN communication method in accordance with one embodiment of the invention from the perspective of the mobile WLAN base station. As shown in block 300, the method includes tracking the available multi-wireless device message memory capacity and track other service related options or characteristics such as the estimated time to the next fixed base station, providing the capacity level data to the sending device and other service option characteristic data to a sending device during the delivery set-up process. As such, the processing circuitry 28 tracks the available multi-wireless device message memory capacity and also stores other service options or delivery characteristics such as the estimated time that the mobile WLAN device will come within range of a next fixed base station. This maybe determined for example based on the current location of the mobile WLAN base station and the route of the vehicle containing the mobile WLAN base station.

As shown in block 302, the method includes receiving a store and forward request from a sending mobile WLAN device to store and forward the message. The store and forward request may be sent as part of a message or may be a separate request, and in any event, may include a request to forward the message to another mobile WLAN device as the current mobile WLAN base station comes within range of another mobile WLAN base station as shown for example in FIG. 1 by the mobile WLAN base station 18 passing the message 38 to a different mobile WLAN base station. The store and forward request may also include for example whether to forward the message to a fixed WLAN base station, a fixed collector base station or any other suitable destination. If the sending WLAN device authorizes the mobile WLAN base station to forward the message to another mobile WLAN base station, the current mobile WLAN base station may interrogate other neighboring mobile WLAN base station to see if it has suitable capacity and other characteristics to suitably forward the message to another destination point.

As shown in block 304, the method includes providing a response to the sending mobile WLAN device. The response includes a device identifier associated with the mobile WLAN device and data representing the service options and message delivery characteristics. For example, a response to the received request is sent by the mobile WLAN base station that includes the mobile WLAN ID and the service options and delivery characteristics associated with the mobile WLAN base station which may include, for example, data representing the estimated delivery time, whether the mobile WLAN base station includes wide area network communication capability, the multi-wireless device message collection memory capacity, or any other suitable information. As shown in block 306 the mobile WLAN device sends the message and the mobile WLAN base station which receives the message for storage and analysis of any information tags associated with the message that were provided by the sending wireless WLAN device. The mobile WLAN base station analyzes for example a service identifier of the sending device to see if the sending device requested different type of service or changing service. For example, the processing circuitry 28 analyzes a message tag associated with the message received from the sending mobile WLAN device and may determine for example a usage charge for the sending mobile device using the mobile base station.

As shown in block 308, the method includes determining if at least one of the fixed WLAN base station and another mobile WLAN device, with store and forward capability, is within communication range. This maybe done for example in the background while the other operations are being performed. As shown in block 310, if the mobile WLAN base station is within communication range of a suitable destination device, the mobile WLAN base station 16 forwards the stored message using the WLAN transceiver 26. Hence, the mobile WLAN base station 16 downloads the stored messages from the plurality of mobile WLAN devices or a single message from a sending mobile WLAN device to for example another mobile WLAN base station, fixed WLAN base station, or other suitable destination.

The processing circuitry 28 is also operative to negotiate with the mobile WLAN device since it may only have a limited amount of capacity for a fixed period of time depending upon whether the mobile WLAN base station is in a bus route, taxi route, or other suitable route. The processing circuitry 28 deletes expired stored messages when the expiry period lapses to avoid carrying messages for unacceptable periods of time.

The mobile WLAN base station 16 (the processing circuitry 28) is operative to hold these stored messages until the mobile WLAN base station is within WLAN communication range of a fixed WLAN base station that may be coupled to a wide area network (fixed base station 14), another mobile WLAN device that may include both a WLAN transceiver and a WWAN transceiver, such as another mobile WLAN base station, and when in range forwards, or retransmits the stored message using the WLAN transceiver.

During the connection between a mobile device and a mobile WLAN base station, negotiation takes place to determine a quality of service attributes for the message. For example a message expiration period was selected such that message is not delivered to a fixed WLAN base station within the time period are deleted from the mobile WLAN base station's memory. This may allow a user to select a time period beyond which the message is no longer useful and allows the mobile WLAN base station to free up memory by removing old messages.

The mobile WLAN base station 16 may also be equipped with a location finding circuits such as a GPS circuit or other suitable positioning circuit to provide location addresses or other location data that may be applied to each received message with the coordinate or other geographic description indicating where the message was received. This location data is passed on to the network or service provider for future use including for example notifying the message recipient of the senders location or the routing of replies or acknowledgements.

As noted, the mobile WLAN device may attempt connection when it is in range with another WLAN enabled device automatically by periodically scanning for base stations whenever a message is in queue to be sent, or a user can manually request a determinations to whether or not a WLAN connection can be made. The manual approach can minimize battery life, while the automatic scan relieves a user from having to initiate the connection process.

The method may also include transferring the stored collected messages from a plurality of mobile WLAN devices from one mobile WLAN base station 18 to another mobile WLAN base station 16. Communication from one mobile WLAN base station to another mobile WLAN base station may occur if one mobile WLAN base station is stationary for a predetermined period of time, or if one mobile WLAN base station does not have sufficient memory capacity to store additional messages, or if a mobile WLAN base station stores a message with destination locations along a determined route of the other mobile WLAN base station. This maybe determined for example based on the location data that maybe provided by each mobile WLAN base station.

The mobile WLAN device 12a, through the processing circuitry 24, may provide electronic payment data with a message as part of the tag information to allow the mobile WLAN base station, or a fixed WLAN base station or other network element within a wide area network to assign payment for delivery of the message sent via the mobile WLAN base station. This may be any suitable identification data, token, debit token, or any other suitable information.

Figure 4:
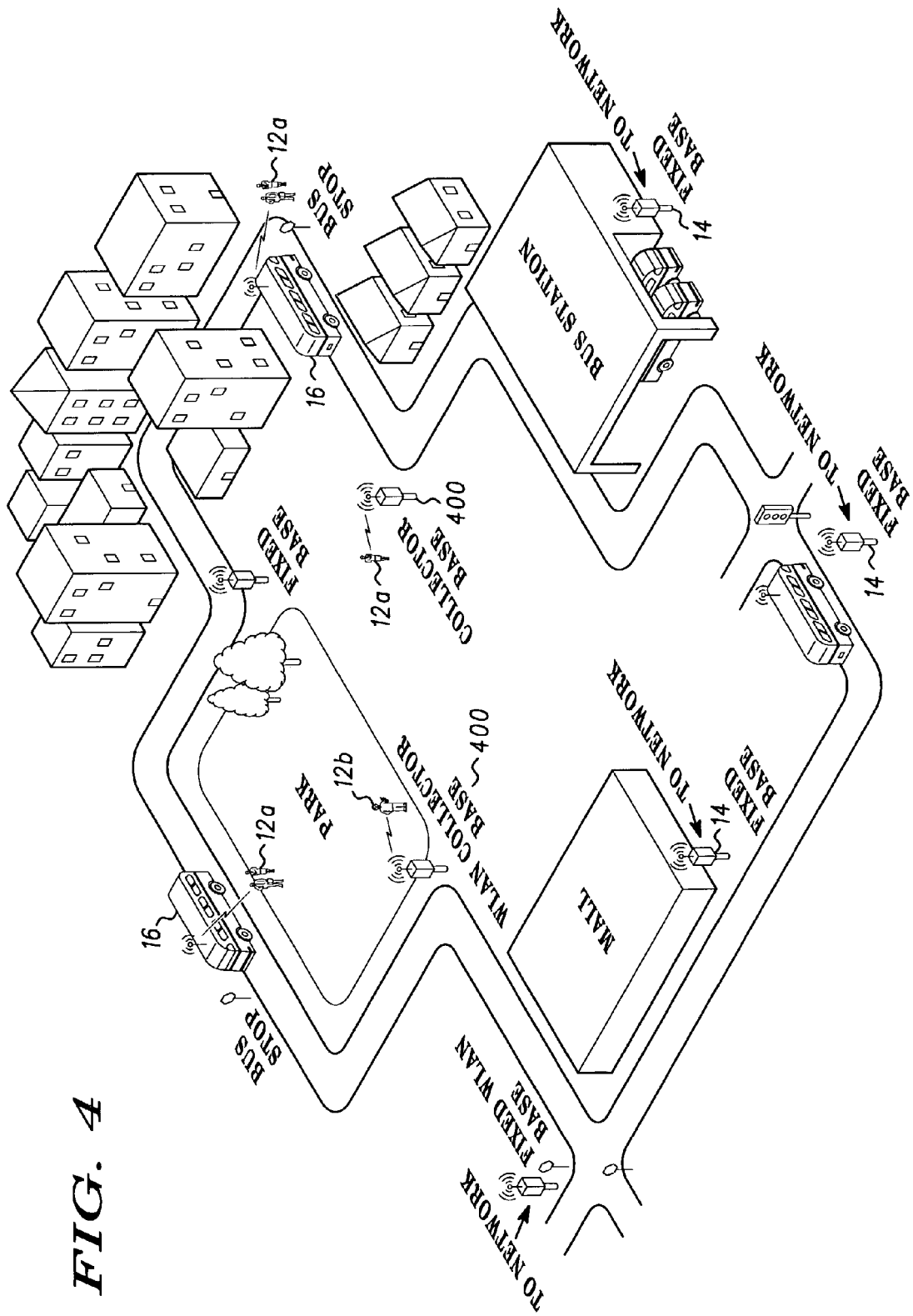
FIG. 4 is a diagram illustrating an exemplary transportation system employing a WLAN communication system in accordance with one embodiment of the present invention.

FIG. 4 is one example of a wireless communication system employed by a transportation system in accordance with one embodiment of the invention. As shown, a bus or other vehicle serves as the mobile WLAN base station. The transportation system also includes a plurality of fixed WLAN collector base stations 400 as well as a plurality of fixed WLAN devices 14 operably coupled to the suitable networks. The WLAN collector base stations 400 are fixed and serve as low cost collection points for messages. The fixed WLAN collector base stations 400 are preferably located at natural stopping points such as bus stops, traffic lights or other suitable stopping points along known routes of the mobile WLAN base station 16 to help insure that stored messages eventually delivered to the network or service provider. Mobile WLAN devices upload messages to the fixed WLAN collector base stations 400. The mobile WLAN base stations pass by periodically to collect the messages stored by the fixed WLAN collector base stations 400 and deliver the collected messages to the network via the WLAN communication devices 14.

The fixed WLAN collector base stations 400 include a wireless local area transceiver, a multi-wireless device message collection memory and processing circuitry, operatively coupled to the multi-wireless device message collection memory that is operative to forward the stored collective messages received from the plurality of the mobile WLAN devices to the mobile WLAN base station in response to the mobile WLAN base station coming within communication range of the fixed WLAN device.

In addition, if the location of a recipient device is included with the message, then one or more mobile WLAN base stations delivers the message directly and without giving it to network or service provider. The location of the recipient can be identified by street address, GPS coordinates or fixed WLAN base station identifiers since they may be associated with a specific location. If the mobile WLAN base station determines that the recipient is located along a known route, the message is transferred to the mobile WLAN base station for delivery. For example, if a mobile WLAN base station on a particular city bus passes by a particular train station, users at the train station send messages to persons at another location via the city bus route.

Figure 5:
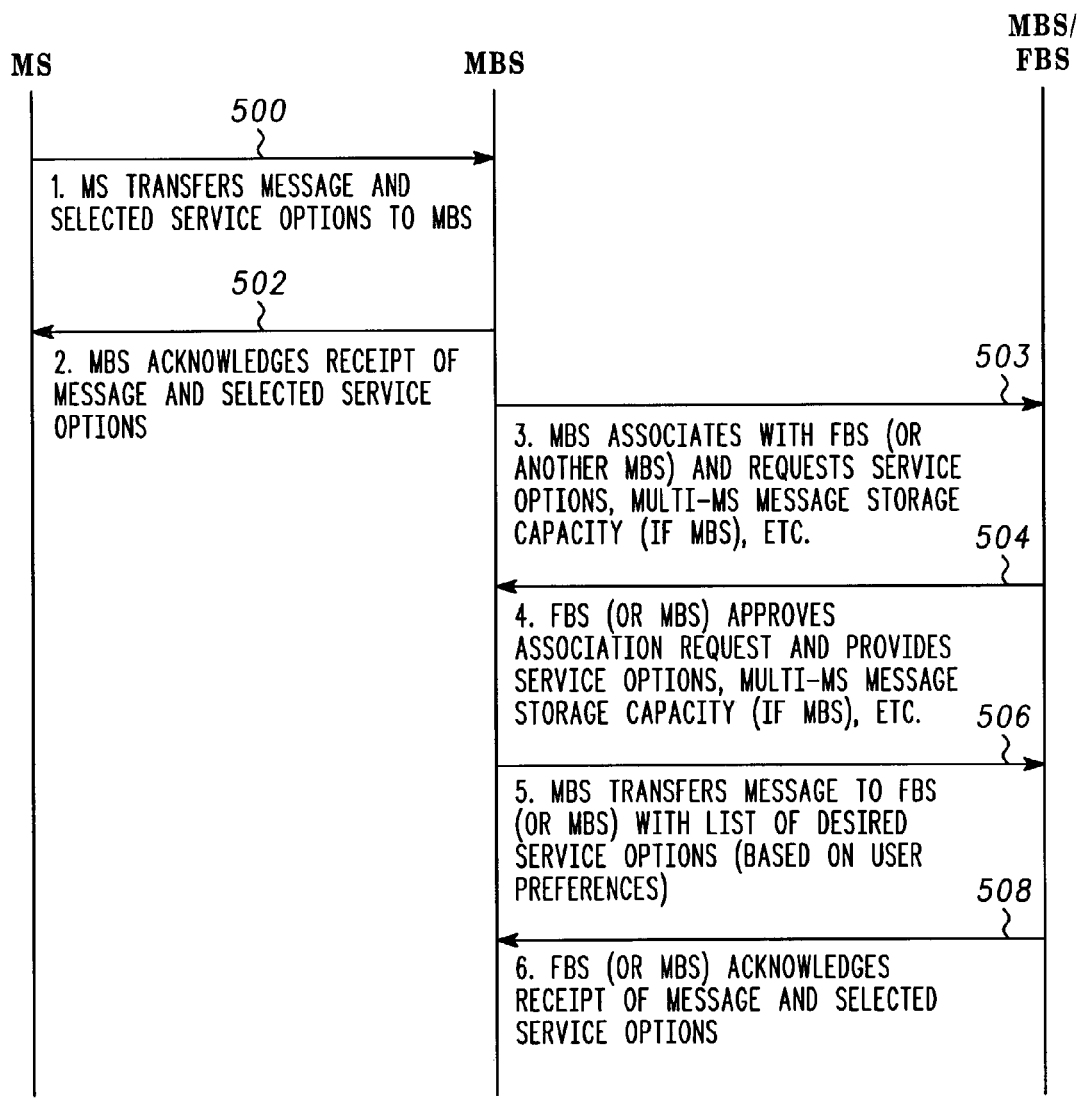
FIG. 5 is a messaging flow diagram illustrating messages exchanged between components of a WLAN communication system in accordance with a preferred embodiment of the present invention.

FIG. 5 is a message flow diagram in accordance with one embodiment of the invention and illustrates a data flow diagram of messages between a mobile WLAN base station and a mobile WLAN base station or fixed base station. As shown by message 500, the mobile WLAN device transfers the message and selected service options that user has selected, to the mobile WLAN base station. As shown by message 502, the mobile WLAN base station acknowledges receipt of the message and the selected service options. As shown by message 503, the mobile WLAN base station, when in range with a fixed base station containing a WLAN receiver, requests service options that can be provided by the fixed WLAN base station as well as the multimobile device message storage capacity level if the unit being communicated with is another mobile WLAN base station. As shown by message 504, the fixed WLAN base station approves the request and provides service options and the multi-device message collection memory capacity level.

As shown by message 506, in response, the mobile WLAN base station transfers the message or messages to the fixed WLAN base station with a list of desired service options based on user preferences entered by a user when the mobile WLAN device originally sent the message. As shown by message 508, the fixed WLAN base station acknowledges receipt of the message and the selected service options and then communicates the message via the network to the appropriate destination.

The location identification data such as a street name or address or other suitable location information is associated by the processing circuitry 28 for a mobile WLAN base station to assist in routing collected messages among fixed WLAN base stations or another mobile WLAN base station as noted above.

As such, the above devices and methods allow vehicles or other mobile devices to become mobile WLAN base stations to increase the systems coverage. High latency messages can be delivered to the network or system as soon as contact is made with the next available fixed WLAN base station, while low latency messages can be delivered to the network far more quickly via a wide area protocol. The fixed and mobile WLAN base stations may be relatively inexpensive compared to wide area systems. Vehicles, pedestrians with WLAN equipment act as mobile base stations. The mobile WLAN base station act as either carriers of messages for a plurality of different users, or repeaters for messages generated by mobile devices.

Also, although for purposes of illustration an originating device was described above as being a mobile WLAN device, it will be recognized that the originating device may also be a fixed WLAN device.

In addition, service options may also be provided that indicate to a user or mobile device the approximate delivery time based on historical time data or based on distance information such as a known route that the message will take given the route of a mobile WLAN base station. Other advantages will be recognized by those with ordinary skill in the art.

It should be understood that the implementation of other variations and modifications of the invention and its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A mobile wireless device comprising:
a first transceiver that transmits and receives messages over a wireless local area network, the first transceiver being operatively coupled to receive a message transmitted by at least one sending device;
memory, operatively coupled to the first transceiver, that stores the message to produce a stored message;
a second transceiver, operatively coupled to the memory, that transmits and receives messages over a wireless wide area network;
processing circuitry, operatively coupled to the memory and the second transceiver, the processing circuitry being operative to instruct the second transceiver to transmit the stored message to a wide area network; and
a second memory operatively coupled to the processing circuitry, wherein the second memory stores data representing at least one of: service options data and/or message delivery characteristic data.

2. The mobile wireless device of claim 1, wherein the processing circuitry further tracks available capacity of the memory and provides capacity level data to the sending device via the first transceiver.

3. The mobile wireless device of claim 1, wherein the processing circuitry further:
receives a store and forward request from the sending device to store and forward the message; and
provides a response to the sending device, wherein the response includes a device identifier associated with the mobile wireless device and data representing at least one of: service options and message delivery characteristics.

4. The mobile wireless device of claim 3, wherein the processing circuitry further analyzes a message tag associated with the message to determine a usage charge for the sending mobile wireless device.

5. The mobile wireless device of claim 1, wherein the processing circuitry further:
determines whether at least one of a fixed WLAN base station and another mobile wireless device, with store and forward capability, is within communication range; and
if in range, forwards the stored message using the first transceiver.

6. The mobile wireless device of claim 1, wherein the processing circuitry is further operative to negotiate an expiry period for the stored message and to delete the stored message when the expiry period lapses.

7. A mobile wireless device comprising:
a transceiver that transmits and receives messages over a wireless local area network, the transceiver being operative to receive a message transmitted by a sending device;
memory operatively coupled to the transceiver, the memory storing the message to produce a stored message; and
processing circuitry, operatively coupled to the memory and the transceiver, that includes interrogating a mobile WLAN device to determine if the mobile WLAN device is a mobile WLAN base station that includes multi-wireless device message collection memory that stores collected message received from a plurality of WLAN devices and that detects when the mobile wireless device is within communication range of at least one of: a target device that is coupled to the wireless local area network and has connectivity to a wide area network and a target mobile WLAN device with store and forward capability, when in range, instructs the transceiver to transmit the stored message to the target device.

8. The mobile wireless device of claim 7, wherein the processing circuitry further provides data to the target device indicating whether the stored message requires further re-transmission by another mobile wireless device.

9. The mobile wireless device of claim 7, wherein the processing circuitry is further operative to determine location data of a received message from another mobile WLAN device and associate the location data with the message for use by a network.

10. A WLAN device comprising:
processing circuitry operative to interrogate a mobile WLAN device to determine if the mobile WLAN device is a mobile WLAN base station that includes multi-wireless device message collection memory that stores collected message received from a plurality of WLAN devices and a capacity of the multi-wireless device message collection memory.

11. The WLAN of claim 10 wherein the processing circuitry receives user control data and determines, based on the user control data, if message is to be sent to a plurality of different mobile base stations to provide diversity reception by a receiving unit.

12. The WLAN of claim 10 wherein the processing circuitry is operative to associate location identification data for a mobile WLAN base station to assist in routing collected messages among at least one of a fixed WLAN base station and a mobile WLAN base station.

13. A method for a mobile wireless device to communicate messages in a wireless local area network, the method comprising:
receiving a message from a sending device;
storing the message to produce a stored message;
interrogating a mobile WLAN device to determine if the mobile WLAN device is a mobile WLAN base station that includes multi-wireless device message collection memory that stores collected message received from a plurality of WLAN devices;
determining whether the mobile wireless device has traveled within communication range of a target device that is coupled to the wireless local area network; and
delivering the stored message to the target device subsequent to determining that the mobile wireless device has traveled within communication range of the target device.

14. The WLAN communication method of claim 13 including providing data indicating whether the delivered message requires further re-transmission by another mobile WLAN base station.

15. The WLAN communication method of claim 13 including receiving, by an originating WLAN device, user control data and determining, based on the user control data, if a message can be sent to a plurality of different mobile WLAN base stations to provide diversity reception by a receiving unit.

16. The WLAN communication method of claim 13 including transferring stored messages of a plurality of WLAN devices from a first mobile WLAN base station to a second mobile WLAN base station if at least one of the following conditions occurs:

the first mobile WLAN base station is stationary for a predetermined period of time;

the first mobile WLAN base station does not have sufficient memory capacity to store additional message; and the first mobile WLAN base station stores message whose destination is located along a determined route of the second mobile WLAN base station.

17. The WLAN communication method of claim 13 including providing electronic payment data with stored message to allow at least one of a mobile WLAN base station, fixed WLAN base station and network element to assess payment for delivery of the stored message.

18. The WLAN communication method of claim 13 including providing to a sending mobile WLAN device, an expected time of delivery of a message.

19. A mobile wireless device comprising:

a transceiver that transmits and receives messages over a wireless local area network, the transceiver being operative to receive a message transmitted by a sending device;

memory operatively coupled to the transceiver, the memory storing the message to produce a stored message;

processing circuitry, operatively coupled to the memory and the transceiver, that detects when the mobile wireless device is within communication range of at least one of: a target device that is coupled to the wireless local area network and has connectivity to a wide area network and a target mobile WLAN device with store and forward capability, when in range, instructs the transceiver to transmit the stored message to the target device; and wherein the processing circuitry further provides data to the target device indicating whether the stored message requires further re-transmission by another mobile wireless device.

20. A mobile wireless device comprising:

a transceiver that transmits and receives messages over a wireless local area network, the transceiver being operative to receive a message transmitted by a sending device;

memory operatively coupled to the transceiver, the memory storing the message to produce a stored message;

processing circuitry, operatively coupled to the memory and the transceiver, that detects when the mobile wireless device is within communication range of at least one of: a target device that is coupled to the wireless local area network and has connectivity to a wide area network and a target mobile WLAN device with store and forward capability, when in range, instructs the transceiver to transmit the stored message to the target device; and wherein the processing circuitry is further operative to determine location data of a received message from another mobile WLAN device and associate the location data with the message for use by a network.

21. A method for a mobile wireless device to communicate messages in a wireless local area network, the method comprising:

receiving a message from a sending device;

storing the message to produce a stored message;

determining whether the mobile wireless device has traveled within communication range of a target device that is coupled to the wireless local area network;

delivering the stored message to the target device subsequent to determining that the mobile wireless device has traveled within communication range of the target device; and providing data indicating whether the delivered message requires further re-transmission by another mobile WLAN base station.

22. A method for a mobile wireless device to communicate messages in a wireless local area network, the method comprising:

receiving a message from a sending device;

storing the message to produce a stored message;

determining whether the mobile wireless device has traveled within communication range of a target device that is coupled to the wireless local area network;

delivering the stored message to the target device subsequent to determining that the mobile wireless device has traveled within communication range of the target device; and receiving, by an originating WLAN device, user control data and determining, based on the user control data, if a message can be sent to a plurality of different mobile WLAN base stations to provide diversity reception by a receiving unit.

23. A method for a mobile wireless device to communicate messages in a wireless local area network, the method comprising:

receiving a message from a sending device;

storing the message to produce a stored message;

determining whether the mobile wireless device has traveled within communication range of a target device that is coupled to the wireless local area network;

delivering the stored message to the target device subsequent to determining that the mobile wireless device has traveled within communication range of the target device; and providing electronic payment data with stored message to allow at least one of a mobile WLAN base station, fixed WLAN base station and network element to assess payment for delivery of the stored message.

* * * * *